3,133,963
BENZAMIDES
Bruce W. Horrom, Waukegan, Ill., assignor to Abbott Laboratories, North Chicago, Ill., a corporation of Illinois
No Drawing. Filed Sept. 18, 1962, Ser. No. 224,513
5 Claims. (Cl. 260—558)

The present invention relates to substituted aromatic amides of substituted propynylamines. More particularly, it is concerned with 3,4,5,-trisubstituted benzamides of 1,1-dialkylpropynylamines and with a method for the preparation of such compounds.

The novel compounds of this invention are represented by the formula

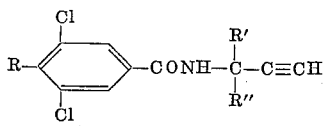

wherein R is methoxy or amino, and wherein R' and R" are loweralkyls.

Essentially, the new compounds are made by reacting the 4-amino-(or 4-methoxy)-3,5-dichlorobenzoic acid or its corresponding reactive derivative with a propynylamine which is disubstituted with loweralkyls in the 1-position. The alkyl substituents of propynylamine may be straight-chain or branched hydrocarbon groups containing up to four carbon atoms in each substituent. These propynylamines are made by the method of G. F. Hennion and Eugene G. Teach, described in J.A.C.S. volume 75, pages 1653–4 (1953). The reactive derivative of the trisubstituted benzoic acid to which reference is made above includes the acid halides or the loweralkyl ester.

In the preferred embodiment, the reaction between the substituted benzoic acid chloride and the propynylamine of the above type is carried out in the presence of an acid acceptor, i.e. a trialkylamine, an N,N-dialkylamine, an alkali carbonate, an earth alkali carbonate, an earth alkali bicarbonate, an alkali bicarbonate, etc., or an excess of the selected propynylamine used as a reactant. The reaction may be performed in an inert diluent such as ether, acetone, ethyl acetate, benzene, toluene, dimethylacetamide, dimethylformamide, or similar inert organic liquids. The term "inert" is used here to express that such a diluent is unreactive with the particicipants of the reaction, the end product, and the acid acceptor where the latter is used. The reaction can be performed within a temperature range between −20° and +50° C. or the boiling point of the diluent, whichever is lower. A satisfactory temperature for this reaction is room temperature. The new amides can be separated from the reaction mixture by evaporation of the solvent, by precipitation with water, or similar known procedures. In all cases, almost quantitative yields are obtainable.

The newly substituted benzamides are useful as muscle-relaxants; they possess the pharmacological properties of relaxing skeletal muscles through inhibition of synaptic transmission in the spinal cord as distinguished from the neuro-muscular blocking action of compounds of the curare-type, or the severely central nervous-system depressing compounds such as the barbiturates. The new compounds are also useful as tranquilizers and anti-convulsants. As anti-convulsants, they are particularly effective in shock treatments with electro-shock or Metrazol® (7,8,9,10-tetrazabicyclo[5.3.0]-8,10-decadiene).

The following examples are presented to teach the invention in more detail but should not be construed as exclusive embodiments of the invention. They are given only to illustrate the preparation of some members of the heretofore unknown series of trisubstituted N-(1,1-dialkylpropynyl)benzamides.

EXAMPLE 1

N-(1-Methyl-1-Ethylpropynyl)-3,5-Dichloro-4-Methoxybenzamide

A solution of 80 cc. of thionyl chloride in 80 cc. of dry benzene and 1 cc. of dimethylformamide is refluxed with 22.1 grams of 3,5-dichloro-4-methoxybenzoic acid until the evolution of hydrochloric acid gas ceases. The mixture is then concentrated on a steam bath and 80 cc. of dry benzene is added. Reconcentration of this mixture is followed by the addition of 50 cc. of dimethylacetamide at room temperature. The solution obtained is added dropwise to a solution of 10.2 grams of triethylamine and 9.7 grams of 1-methyl-1-ethylpropynylamine in 50 cc. of dimethylacetamide. After this addition is completed, the mixture is stirred for two hours at room temperature and then poured into a large volume of water. The resulting oil is extracted with ether and the ether extract is separated, washed in turn with a 10% potassium hydroxide solution, dilute hydrochloric acid, and water. The ether solution is decolorized with activated carbon, filtered, and dried over magnesium sulfate. After filtration of the magnesium sulfate, the ether is evaporated, leaving 25.1 grams of N-(1-methyl-1-ethylpropynyl)-3,5-dichloro-4-methoxybenzamide, melting at 84–85° C. After recrystallization of this crude material from Skellysolve B (a saturated hydrocarbon mixture predominantly consisting of hexane), 22.9 grams of pure material is obtained, melting at 87–88° C. Chemical analysis shows 4.54% nitrogen, which corresponds with the calculated value for this compound.

The new compound has an oral $LD_{50}$ of 1500 mg./kg. and an intraperitoneal $LD_{50}$ of 1200 mg./kg. in mice. The effective dose in rats is 50 mg./kg. orally for muscle relaxant activity.

EXAMPLE 2

N-(1-Methyl-1-(n)-Propylpropynyl)-3,5-Dichloro-4-Aminobenzamide

By following the procedure of Example 1, but substituting 4-amino-3,5-dichlorobenzoic acid for 3,5-dichloro-methoxybenzoic acid, and replacing 1-methyl-1-ethylpropynylamine with 1-methyl-1-propylpropynylamine, the formed N-(1-methyl-1-(n)-propylpropynyl)-3,5-dichloro-4-aminobenzamide precipitates. The reaction mixture is poured into water and the crude water-insoluble product is filtered off and dried. Recrystallization of this crude material from Skellysolve C (a saturated hydrocarbon mixture predominantly consisting of heptane) produces the pure product which has a melting point of 98° C. and analyzes 9.59% nitrogen which is in agreement with the calculated value for this compound.

The oral $LD_{50}$ of this compound is 1200 mg./kg. and the intraperitoneal $LD_{50}$ is 600 mg./kg. in mice.

EXAMPLE 3

N-(1-Methyl-1-(n)-Propylpropynyl)-3,5-Dichloro-4-Methoxybenzamide

By replacing 4-amino-3,5-dichlorobenzoic acid of Example 2 with 3,5-dichloro-4-methoxybenzoic acid and otherwise proceeding as shown in Example 2, N-(1-methyl - 1- (n) - propylpropynyl) - 3,5 - dichloro - 4-methoxybenzamide is obtained in a good yield. The new compound melts at 72–73° C. and analyzes 57.34% C, 5.63% H, and 4.48% N, which is in agreement with the calculated values.

The $LD_{50}$ of this product in mice is above 2000 mg./kg. with oral or intraperitoneal administration.

EXAMPLE 4

N-(1,1-Dimethylpropynyl)-3,5-Dichloro-4-Methoxybenzamide

By following the procedure of Example 1 but replacing 1-methyl-1-ethylpropynylamine with 1,1-dimethylpropynylamine, N-(1,1-dimethylpropynyl)-3,5-dichloro-4-methoxybenzamide is obtained in good yield. It has a melting point of 111–112° C. and chemical analysis shows 4.73% nitrogen which is in agreement with the calculated value.

The new compound has an intraperitoneal $LD_{50}$ of 600 mg./kg. and an oral $LD_{50}$ of above 900 mg./kg. in mice. The effective oral dose in rats is 40 to 50 mg./kg.

EXAMPLE 5

N-(1-Methyl-1-Ethylpropynyl)-3,5-Dichloro-4-Aminobenzamide

By following the procedure of Example 1 but replacing 3,5-dichloro-4-methoxybenzoic acid with 4-amino-3,5-dichlorobenzoic acid and substituting ether as reaction medium for benzene used above, N-(1-methyl-1-ethylpropynyl)-3,5-dichloro-4-aminobenzamide is obtained in good yield, melting at 129–130° C. and analyzing 9.91% nitrogen which is in agreement with the calculated value.

The oral $LD_{50}$ of the new compound in mice is 900 mg./kg. and the corresponding intraperitoneal value is 800 mg./kg. The effective dose level as a muscle relaxant is 150–200 mg./kg. in rats.

EXAMPLE 6

N-(1,1-Dimethylpropynyl)-3,5-Dichloro-4-Aminobenzamide

By following the procedure of Example 4 but substituting 4-amino-3,5-dichlorobenzoic acid for 3,5-dichloro-4-methoxybenzoic acid and using dimethylformamide as reaction solvent in place of dimethylacetamide, N-(1,1-dimethylpropynyl)-3,5-dichloro-4-aminobenzamide is obtained in good yield, melting at 137–138° C. Chemical analysis shows 10.39% nitrogen which is in agreement with the calculated values for this compound.

The oral $LD_{50}$ in mice for this compound is 1500 mg./kg. while the corresponding intraperitoneal value is 400 mg./kg. The effective dose for this compound as a muscle relaxant is 75 mg./kg. intraperitoneally in rats.

Other compounds made according to the above examples are the N-(1(n)-butyl-1-methylpropynyl)amides, the N-(1-ethyl-1-propylpropynyl)amides, the N-(1-(n)-butyl-1-ethylpropynyl)amides, the N-(1,1-di-(i)-propylpropynyl)amides, and the N-(1,1-diethylpropynyl)amides of 3,5-dichloro-4-methoxybenzoic acid and 4-amino-3,5-dichlorobenzoic acid. Each of these compounds has an oral $LD_{50}$ of between 900 and about 200 mg./kg. while the corresponding intraperitoneal values are between 400 and about 2000 mg./kg.

The tranquilizing and muscle-relaxing effects as well as the anti-convulsant activity of the new compounds are obtained in warm-blooded animals by the oral administration of between 50 and 150 mg./kg. in a 24-hour period. The active compounds may be administered alone or in combination with other drugs in any acceptable pharmaceutical form, e.g. as tablets, in capsules, or in solution, with the usual excipients, adjuvants, coatings, flavoring agents, etc.

Others may practice the invention in any of the numerous ways which will be suggested to one skilled in the art by the present disclosure. All such practice of the invention shall be considered a part hereof provided it falls within the scope of the appended claims.

I claim:

1. A benzamide of the formula

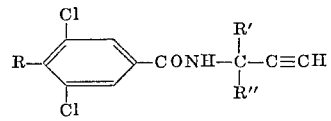

wherein R is selected from the group consisting of methoxy and amino and wherein R' and R" are loweralkyl.

2. N-(1,1-dimethylpropynyl)-3,5-dichloro-4-methoxybenzamide.

3. N-(1-methyl-1-ethylpropynyl)-3,5-dichloro-4-methoxybenzamide.

4. N-(1-methyl-1-ethylpropynyl)-3,5-dichloro-4-aminobenzamide.

5. N-(1,1-dimethylpropynyl)-3,5-dichloro-4-aminobenzamide.

References Cited in the file of this patent

UNITED STATES PATENTS

| | | |
|---|---|---|
| 2,901,507 | Speeter et al. | Aug. 25, 1959 |
| 3,036,128 | Moffett | May 22, 1962 |

OTHER REFERENCES

Hennion et al.: Jour. Am. Chem. Soc., vol. 75, pages 1653–1654 (1953), QD1 A5.

UNITED STATES PATENT OFFICE
CERTIFICATE OF CORRECTION

Patent No. 3,133,963　　　　　　　　　　　　　　　May 19, 1964

Bruce W. Horrom

It is hereby certified that error appears in the above numbered patent requiring correction and that the said Letters Patent should read as corrected below.

Column 1, line 47, for "particicipants" read -- participants --; column 4, line 5, for "200 mg./kg." read -- 2000 mg./kg. --.

Signed and sealed this 3rd day of November 1964.

(SEAL)
Attest:

ERNEST W. SWIDER
Attesting Officer

EDWARD J. BRENNER
Commissioner of Patents